United States Patent [19]
Moore, Sr.

[11] Patent Number: 4,515,504
[45] Date of Patent: May 7, 1985

[54] DEBRIS COLLECTOR

[76] Inventor: Ted E. Moore, Sr., 2310 SW. 34th Ave., Fort Lauderdale, Fla. 33312

[21] Appl. No.: 493,941

[22] Filed: May 12, 1983

[51] Int. Cl.³ .............................................. B23B 47/00
[52] U.S. Cl. ..................................... 408/67; 15/257.9; 30/136.5; 408/72 R; 409/134
[58] Field of Search ................... 408/67, 72 R, 241 G, 408/710, 241 R; 409/134, 219; 51/268, 269, 271, 272, 274; 145/116; 144/251 R, 251 A, 251 B, 252; 74/608, 609, 612; 30/136.5, 169, 124; 15/248 R, 248 A, 257.1, 257.2, 257.9; 175/88; 299/12, 18

[56] References Cited

U.S. PATENT DOCUMENTS

| | | | |
|---|---|---|---|
| 2,933,066 | 4/1960 | Rohloff | 120/36 |
| 3,401,724 | 9/1968 | Kreitz | 144/252 X |
| 3,583,821 | 6/1971 | Shaub et al. | 408/72 |
| 3,936,213 | 2/1976 | Kappel | 408/67 |
| 4,067,107 | 1/1978 | Scafetta | 30/136.5 |
| 4,251,171 | 2/1981 | Brett | 408/67 |

FOREIGN PATENT DOCUMENTS

| | | | |
|---|---|---|---|
| 2317779 | 10/1974 | Fed. Rep. of Germany | 408/67 |
| 1334366 | 10/1973 | United Kingdom | 408/67 |
| 2067106 | 7/1981 | United Kingdom | 408/67 |

Primary Examiner—William R. Briggs
Assistant Examiner—Glenn L. Webb
Attorney, Agent, or Firm—Richard M. Saccocio

[57] ABSTRACT

A debris collector for an electric drill is disclosed. The debris collector attaches to the body of the drill and under the drill bit. The flexibility of the collector allows the collector to flex during drilling when the drill bit advances into the work. The debris collector may also be handheld to increase the versatility of the tool such as when drilling oddly angled surfaces.

5 Claims, 7 Drawing Figures

DEBRIS COLLECTOR

BACKGROUND OF THE INVENTION

1. Field of the Invention

This invention relates in general to the field of debris collection devices and in particular to an accessory for a hand-held electric drill for collecting the debris and dust resulting from drilling operations.

2. Description of the Prior Art

Efforts to collect drilling debris generally fall into two indoor categories. One being the collection of the debris associated with professional drilling operations such as machine shops, assembly plants, manufacturing plants, etc. The other category generally involves "do-it-yourselfers" and hobbyists who drill holes to hang drapery rods, build various devices, install shelving and other like home projects. There are, of course, other categories which involve indoor drilling operations which may comprise additional general categories, a discussion of such, however, is not necessary to this prior art description.

Professional drilling operations usually involve high-powered vacuum systems permanently attached to or near the drilling machine, debris filtering lubrication systems built into, for example, a drill press and other like nonportable devices. On the other hand, the around-the-home drilling operations most often involve portable debris collection apparatus. One such example of the latter type of device is disclosed in U.S. Pat. No. 4,251,171. In this example the dust collector is not attached to the drill but rather is held by the hand not being used to drill the hole. The device comprises a handle and a cylinder at right angles to each other. The cylinder is placed against a wall, the drill bit is inserted through the cylinder. The drilling debris is collected within the cylinder. This device while allowing relatively convenient drill bit changing is disadvantageous in that it does not allow for exact drill bit placement on the work surface and the drilling cannot be seen. Thus the location of the drilled hole may not be correct, the angle of the drilled hole may not be correct and the depth of the drilled hole may not be correct.

Two somewhat similar-in-operation examples of devices which rotate with the bit are shown in U.S. Pat. Nos. 3,936,213 and 3,583,821. These each comprise a collapsible cylindrical device through which the drill bit is inserted. As the hole is drilled deeper, the cylinder collapses accordingly. These devices also suffer from the aspects of drill bit placement, angle of the drilled hole and depth of the drilled hole and must be removed in order to change drill bits. German Pat. No. 2,317,779 also discloses a collapsible cylindrical device which is attached to a hand-held drill. In this example. however, the device is attached to the body of the drill and does not rotate with the drill bit. The same above-mentioned disadvantages are associated with this example of the prior art.

United Kingdom Pat. Nos. 2,067,106 and 1,334,366 are both directed toward dust collection devices attached to portable hand-held tools which utilize vacuum or suction pressure to withdraw the debris from the workpiece. In general a cylindrical component through which the bit is inserted is fitted with a port for the attachment of a hose fitted to vacuum apparatus. These devices also are disadvantageous in drill bit placement, gauging or measurement of depth of drilled hole, ability to drill a correctly angled hole, being able to view the drilling operation and drill bit placement.

In accordance with the above, it is to be noted that the prior art debris collection devices adequately collect drilling debris but create other problems which in all probability overshadow the debris collection advantage gained thereby. By necessity, hand-held portable tools such as a drill require full and adequate viewing of the drilling operation. In any drilling operation it is first necessary to place the bit at the location where it is desired that the hole be drilled. Hence, it is an essential requirement that the operator be able to see the tip of the drill bit at the time it is placed against the workpiece. All of the above-noted prior art devices materially and significantly interfere with the bit location requirement.

A second drilling requirement is to drill the hole at the desired angle to the workpiece. This operation also involves viewing the drill bit relative to the work surface upon initiation of the drilling and during the drilling. The prior art devices completely preclude this requirement. The prior art devices require that the operator view the body of the power tool relative to the work surface to ascertain a correct or desired drilling angle. Obviously, this is not a preferred way to drill a correctly angled hole.

Although those prior art devices utilizing a collapsible shroud prevent viewing of the drill bit, it is possible to gauge the depth of the drilled hole by gauging the uncollapsed length of the shroud during the drilling operation. The rigid shrouds of the other prior art devices do not, however, provide this feature. Still, it is much more preferable to directly view the drill bit and perhaps withdraw and reinsert the drill bit in the hole to measure its depth. A collapsible shroud does not allow or readily lend itself to this method of gauging the depth of the drilled hole.

Convenience of changing drill bits is another desirable feature of a debris collection device. This feature does exist on those devices having cylindrical shrouds attached to the drill or portable tool. The shrouds must be removed in order to change bits. Shroud removal is obviously an inconvenient prerequisite to bit changing.

Accordingly, it is a primary object of the present invention to provide debris collection apparatus adapted to be fitted to a portable tool specifically a hand-held electric drill which allows for collection of the drilling debris and allows for viewing of the drill bit during the drilling operations.

Another object of the present invention is to provide debris collection apparatus adapted to be fitted to an electric drill which does not require removal in order to change drill bits.

Still another object of the present invention is to provide debris collection apparatus adapted to be fitted to an electric drill which allows exact placement of the tip of the drill bit at the point the hole is to be drilled.

A further object of the present invention is to provide debris collection apparatus adapted to be fitted to an electric drill which allows proper angling of the drill bit relative to the work surface in order to allow drilling of a correctly angled hole.

An even further object of the present invention is to provide debris collection apparatus adapted to be fitted to an electric drill which easily allows for determination of the depth of the hole being drilled.

Still an even further object of the present invention is to provide debris collection apparatus which is adapted to be fitted to a variety of portable power tools.

SUMMARY OF THE INVENTION

The present invention accomplishes the above-stated objectives and overcomes the disadvantages associated with the prior art devices by providing an accessory for a portable power tool which is attached to the tool and serves to collect the debris generated during use of the tool.

In one embodiment of the invention, the debris collection apparatus comprises three portions. A first portion allows the device to be fitted and held in place on the power tool. A second portion collects and retains the debris. The third portion allows the tool bit or blade to advance into the work surface while firmly maintaining the debris collector against the work surface so as to allow the device to continue to collect the debris while advancing the tool bit. In this embodiment, the three portions are flexibly connected to each other. The second and third portions comprise a substantially flat, triangularly-shaped pan which is positioned below and spaced from the power tool bit. The flexible joints between the portions permit the debris collector to "collapse" during use thereby allowing the tool bit to advance into the work surface. By spacing the debris collector from the tool bit, the power tool operator is able to fully view the tool bit relative to the work surface thereby aiding in the accuracy of the location and angularity of the hole or cut in the work surface. Tool bit changing is easily accomplished with the debris collector in place.

Various other objects, advantages and features of the invention will become apparent to those skilled in the art from the following discussion taken in conjunction with the following drawings; in which:

DESCRIPTION OF THE PREFERRED EMBODIMENTS

Figure 1:
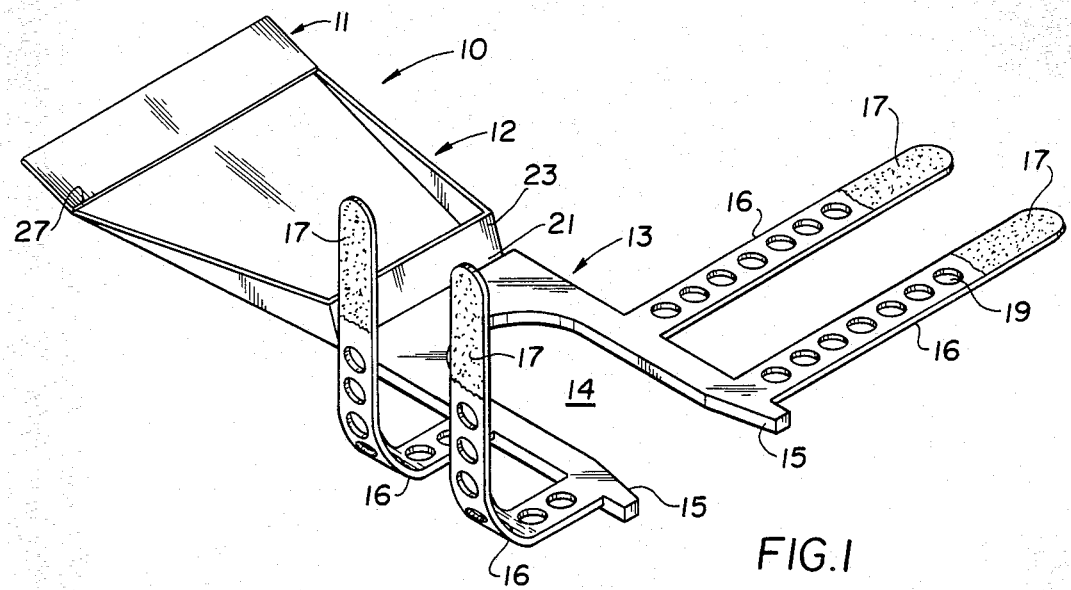
FIG. 1 is a schematic view of one embodiment of the present invention.
Figure 2:
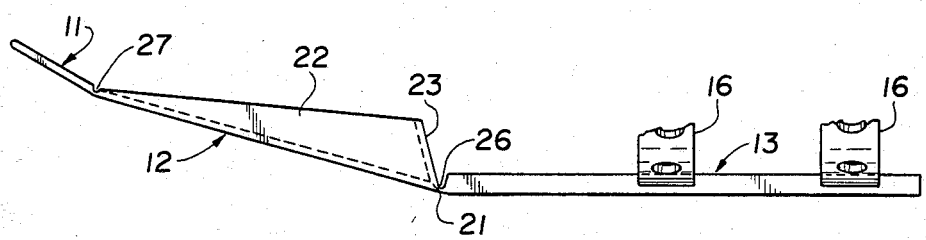
FIG. 2 is a side view of the embodiment of FIG. 1.
Figure 3:
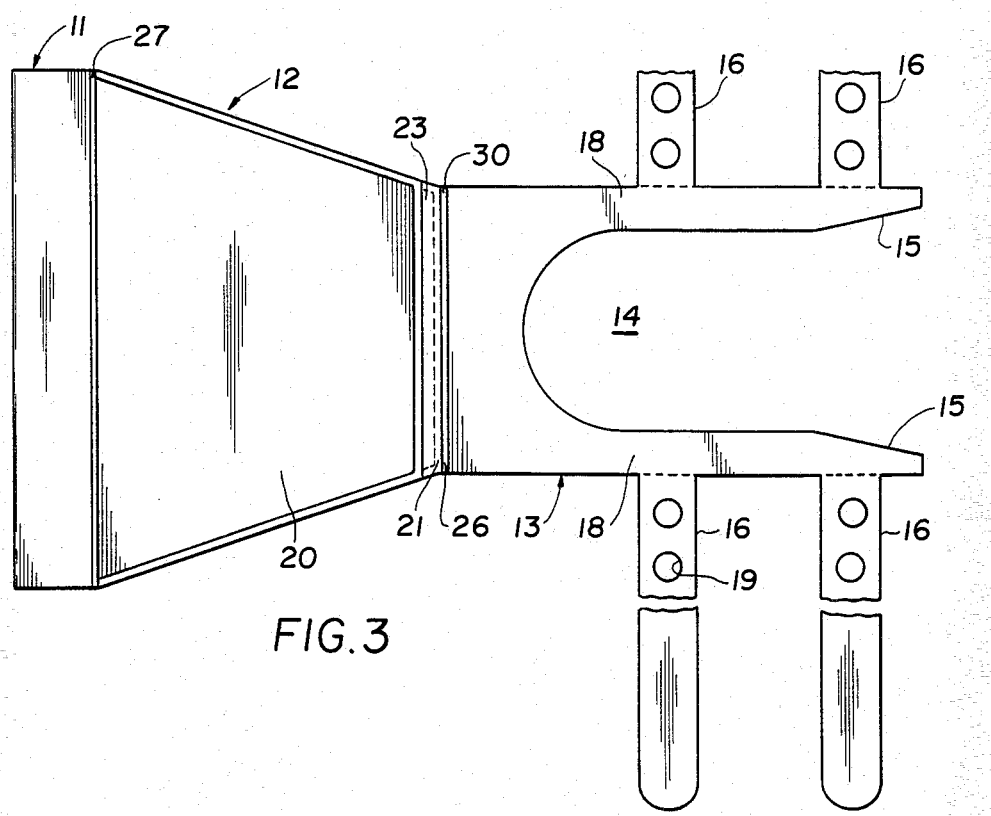
FIG. 3 is a plan view of the embodiment of FIG. 1.

Referring now to the drawings, specifically FIGS. 1 through 5 which collectively illustrate one embodiment of the present invention and whereby like parts are indicated by the same numerals, the inventive debris collector is generally designated as item 10. Debris collector 10 comprises three interconnected portions: a blade portion 11; a collector portion 12; and an attachment portion 13. Debris collector 10 may be made from a moldable plastic material such as polyethylene or other like material which is semirigid but yet flexible enough to be repeatedly bent through a fairly large angle, for example 45°, without fracturing, breaking or tearing. In this manner, the entire debris collector 10 may be made in one piece. It is to be noted, however, that such one piece construction is for purposes of low manufacturing costs and is not a requirement of the invention.

Figure 6:
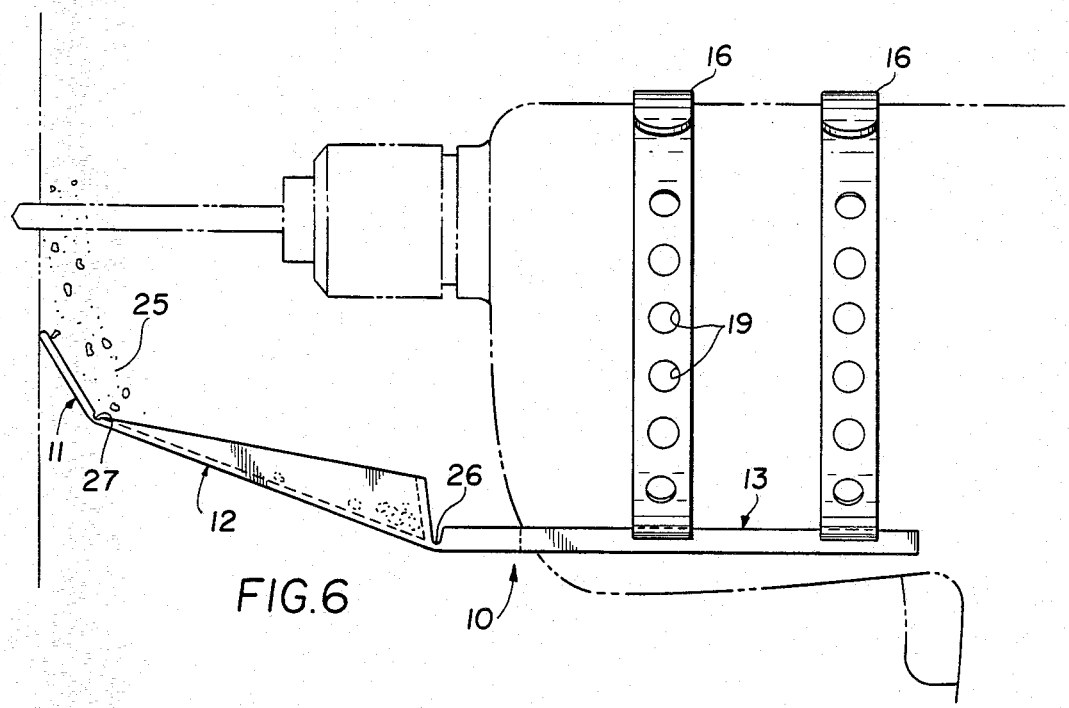
FIG. 6 is a side view of the embodiment of FIG. 2 attached to a portable electric drill and is shown in use; and, FIG. 7 illustrates a provision for obtaining additional flexibility of the debris collector.

Attachment portion 13 comprises an elongated rectangular structure having a generally "U" shaped cutout or opening 14 emanating from one end thereof. The entrance to opening 14 may be tapered 15 for ease of attachment to a portable power tool such as a drill to which the invention is adapted to be fitted. Opening 14 is intended to fit the portion of a drill as indicated in FIG. 6 which portion may be slightly below the horizontal midline of the drill. Most often, the midline of a power tool such as a drill is thicker than the portion below the midline. Thus, if the cutout 14 is smaller than the midline dimension of the drill, fitting of the debris collector 10 to the drill will automatically position cutout 14 below the drill's midline and an application of an upward force to the attachment portion 13 will cause the debris collector to wedge itself against the body of the drill. Straps 16 are provided for this purpose. Straps 16 are extended in an upward direction around the upper body of the drill and are secured to each other at the top of the drill. When so attached, they provide the upward force which firmly wedges the body of the drill within the cutout 14 of debris collector 10. In this manner, debris collector 10 is firmly attached to the drill. Straps 16 include a plurality of holes 19 which allow cooling air to enter those drills equipped with vents and thereby cool the motor in the drill.

In the embodiment illustrated, straps 16 are integrally molded with debris collector 10 and emanate from opposite sides of the attachment portion 13. Straps 16 may include mating portions of a fastening means such as velcro 17, for purposes of connecting corresponding ends to each other. As an alternative, the ends of straps 16 may include other types of conventional and well-known means such as a buckle, snaps, etc. Although not necessary, it is preferable that two pairs of straps 16 be used rather than one pair in order to assure positive engagement of the debris collector 10 to a drill.

Opening 14 may be sized to fit most commercially available drills or may be sized to fit individual drills. While either is satisfactory, the former lends itself to minimizing manufacturing costs and the amount of inventory needed to be carried by a retailer. In prototype testing, an opening 14 having a width of 1 ¾ inches and a length of 3 ½ inches has been found to fit a large number of the drills presently available and may be classified as a standard or universal sized opening 14. Notwithstanding whether opening 14 comprises a standard size or is sized to fit particular drills, the width of legs 18 should be such that each leg is sufficiently rigid to avoid being bent when straps 16 are attached to a drill causing opening 14 to increase in size and further causing debris collector 10 to slip off the drill or being mislocated on the drill so as to defeat its intended use. A leg having a cross-sectional width of ⅜ inches and a thickness of 3/16 inches has been found to be sufficiently strong when commercially available high density polyethylene is used for the debris collector 10. This is not, however, to say that a leg having a smaller or larger cross section would not suffice.

Collector portion 12 functions to collect and retain the debris generated by the power tool during operation. Collector portion 12 includes a base 20 comprising a flat plate having the configuration of a truncated triangle. The smaller end 21 of base 20 abuts and is attached to attachment portion 13. A side plate or lip 22 is attached to each outside edge of base 20 while a back plate 23 is attached to end 21 of base 20. Each end of back plate 23 is respectively connected to the end of side plates 22 which is adjacent thereto such that a continuous lip is formed around the two sides and the back of base 20. In the embodiment shown in the drawings, each side plate 22 tapers from a maximum height at back plate 23 to a minimum height at the junction of blade portion 11 and collector portion 12.

When viewed from the side (FIG. 2), collector portion 12 forms an included angle of approximately 165° with attachment portion 13. This angular configuration causes collector portion 12 to be angled 15° up from a horizontal plane when attachment portion 13 is maintained in a horizontal position such as when attached to a drill and a hole is being drilled perpendicular to a wall and as illustrated in FIG. 6. This feature allows the debris generated during drilling to travel within and down collector portion 12 toward back plate 23 where it is retained and collected between side plates 22 thereby leaving room at the blade end of collector portion 13 for additional debris to be so collected.

Blade portion 11 comprises a flat surface rectangular in shape, attached at one edge to the collector portion 12. Blade portion 11 serves as the leading edge of debris collector 10 and is intended to be placed up against a flat surface such as a wall as illustrated in FIG. 6. In this manner, blade portion 11 serves as an interface between a wall and debris collector 10. The drilling debris 25 exits from the hole being drilled and falls onto blade portion 11. An included angle of approximately 165° exists between blade portion 11 and collector portion 12. This angularity causes the debris 25, caught by blade portion 11, to move by gravity onto and within collector portion 12 making room for additional debris to be caught by blade portion 11. Blade portion 11 may be of a size ¾ inches wide by 4 ½ inches wide.

The connection between blade portion 11 and collector portion 12 is intended to be sufficiently rigid such that the 165° included angle is maintained when the debris collector 10 is not in use but yet sufficiently flexible such that when blade portion 11 is place against a wall of other flat surface it may readily bend along line 30. This flexibility allows the drill bit of the power tool to advance into the work surface while maintaining the debris collecting features of the debris collector 10. It is to be noted that the flexible connection between collector portion 12 and attachment portion 13 at line 30 also serves to allow advancement of the drill bit into the work surface while maintaining the debris collection function of the inventive apparatus. In this regard, the inventive debris collector 10 "collapses" during the drilling operation to allow drilling a hole of sufficient or desired depth.

Figure 4:
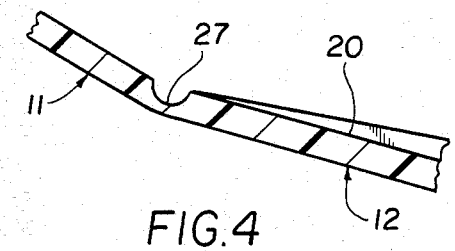
FIG. 4 is an enlargement of one hinged joint of the embodiment of FIG. 1.
Figure 5:
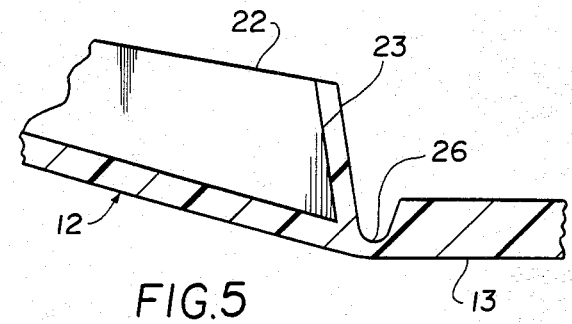
FIG. 5 is an enlargement of another hinged joint of the embodiment of FIG. 1.

FIGS. 4 and 5 which respectively depict the joints between the blade 11 and collector 12 portions and the collector 12 and attachment 13 portions illustrate one method of obtaining collapsibility of the debris collector 10 so that the drill bit may be advanced into the work surface to drill a hole of desired depth. Grooves 26 and 27 are provided in the thickness of base 20 transverse to the axial centerline of the debris collector 10. In the example used, a remaining base thickness of approximately 1/16 inch at the bottom of grooves 26 and 27 has been found to provide a good combination of flexibility and rigidity. A number of alternate methods are available to assure that grooves 26 and 27 provide a sufficient degree of bendability. One method comprises a sufficiently wide mouth across the groove. Another comprises angling the side surfaces of the groove away from each other. The latter method is illustrated in FIG. 5.

Figure 7:
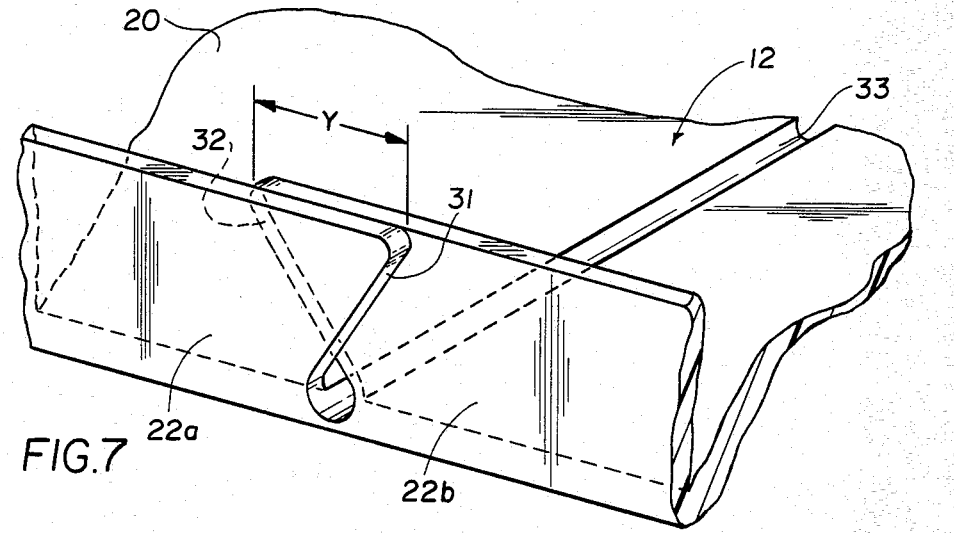

FIG. 7 shows another embodiment which allows for additional collapsibility during drilling. The same two flex joints of the prior embodiment exist at the junction of the blade and collector portions and the collector and attachment portions; however, one or more additional flex joints are provided within collector portion 12. Side plate 22 is divided into plates 22a, 22b, etc., the ends of which plates overlap each other by a small distance Y along the top edge of the plate portions which may be approximately ¼ inch. The overlap edges 31 and 32 form an unequal "X" the bottom points of which coincide with the edges of a groove 33 which is provided laterally across the base 20 of collector portion 12. Groove 33 in conjunction with overlapped side plates 22a and 22b allow collector portion 12 to also bend during drilling thereby providing additional collapsibility which further allows a deeper hole to be drilled in the work surface. Additional grooves and overlapped side plates allow for even further collapsibility.

Optimal advantages of the debris collector are obtained when drilling into a surface which is substantially vertical. It is to be realized, however, that the debris collection function of the inventive apparatus is maintained even when the work surface is significantly inclined relative to the vertical and that the inventive apparatus will function even when drilling holes in a horizontal surface provided the drilled hole is angled away from the vertical.

It is to be further noted that the inventive debris collector may be hand held rather than be attached to a drill. In this manner, virtually any surface including odd-angled surfaces may be drilled with the drilling debris being collected during the drilling operation by manual positioning of the debris collector separate and apart from the drill.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. A debris collector adapted to be fitted to a drill comprising a collection portion having a blade portion resiliently flexibly connected to a first end and an attachment portion resiliently flexibly connected to a second opposite end, said blade portion comprising a first flat rectangularly shaped surface, said collection portion comprising a flat truncated triangularly shaped surface having means associated therewith for retaining drilling debris, said attachment portion comprising a second flat rectangularly shaped surface having a "U" shaped cutout, therein emanating from the edge opposite said edge connected to said collection portion said cutout being adapted to be fitted to the body of said drill and means connected to said attachment portion for connecting said debris collector to said drill whereby said flexible connections allow the debris collector to collapse when said drill is being advanced into a work surface thereby allowing simultaneous collection of drilling debris.

2. The debris collector of claim 1, wherein the plane of said first flat surface of said blade portion is positioned at an angle relative to the plane of said flat surface of said collection portion.

3. The debris collector of claim 1, wherein the plane of said flat surface of said collection portion is positioned at an angle relative to the plane of said second flat surface of said attachment portion.

4. The debris collector of claim 1, wherein said drill connection means attached to said attachment portion comprise one or more straps.

5. The debris collector of claim 1, including one or more flexible joints in the collection portion positioned transverse to the axial centerline of said debris collector.

* * * * *